US007827493B2

(12) United States Patent
Sano et al.

(10) Patent No.: US 7,827,493 B2
(45) Date of Patent: Nov. 2, 2010

(54) DATA PROCESSING APPARATUS, DATA PROCESSING METHOD OF DATA PROCESSING APPARATUS, AND COMPUTER-READABLE MEMORY MEDIUM STORING PROGRAM THEREIN

(75) Inventors: Tetsji Sano, Chiba (JP); Jun Konishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 11/839,524

(22) Filed: Aug. 15, 2007

(65) Prior Publication Data

US 2008/0022221 A1    Jan. 24, 2008

Related U.S. Application Data

(60) Division of application No. 10/736,502, filed on Dec. 17, 2003, now Pat. No. 7,272,796, which is a continuation of application No. 09/394,321, filed on Sep. 13, 1999, now abandoned.

(30) Foreign Application Priority Data

Sep. 18, 1998    (JP)   ............................... 10-263775
Aug. 24, 1999    (JP)   ............................... 11-236888

(51) Int. Cl.
     *G06F 15/00*      (2006.01)
     *G06F 13/00*      (2006.01)
(52) U.S. Cl. ...................................... 715/738; 715/747
(58) Field of Classification Search ................ 715/711, 715/714, 735–738, 747, 707, 732, 805, 741
See application file for complete search history.

(56) References Cited

U.S. PATENT DOCUMENTS

| 5,353,399 | A | | 10/1994 | Kuwamoto et al. ......... 345/736 |
|---|---|---|---|---|
| 5,461,710 | A | | 10/1995 | Bloomfield et al. ......... 345/839 |
| 5,644,737 | A | * | 7/1997 | Tuniman et al. ............ 715/810 |
| 5,668,571 | A | | 9/1997 | Pai et al. ..................... 345/794 |
| 5,727,174 | A | | 3/1998 | Aparicio, IV et al. ....... 345/837 |
| 5,774,119 | A | * | 6/1998 | Alimpich et al. ............ 715/764 |
| 5,917,493 | A | | 6/1999 | Tan et al. ..................... 345/835 |
| 5,923,325 | A | | 7/1999 | Barber et al. ................ 345/711 |
| 5,995,101 | A | | 11/1999 | Clark et al. .................. 345/711 |
| 6,002,995 | A | | 12/1999 | Suzuki et al. ................ 702/188 |
| 6,028,679 | A | | 2/2000 | Murphy ....................... 358/407 |
| 6,266,057 | B1 | | 7/2001 | Kuzunuki et al. ........... 345/745 |
| 6,266,082 | B1 | | 7/2001 | Yonezawa et al. ........... 348/159 |
| 6,313,833 | B1 | | 11/2001 | Knight ......................... 345/764 |
| 2003/0107758 | A1 | | 6/2003 | Fujiwara .................... 358/1.15 |

* cited by examiner

*Primary Examiner*—Cao Nguyen
(74) *Attorney, Agent, or Firm*—Fitzpatrick, Cella, Harper & Scinto

(57) ABSTRACT

To freely establish a peripheral equipment selection operating environment of excellent operability which can remarkably reduce an operation burden which is applied until construction information of selectable peripheral equipment can be confirmed and can easily confirm the construction information of the selectable peripheral equipment by everyone by a simple operating instruction, a CPU obtains construction information of a printer that is being selected and default setting on the basis of a selection instructing state relative to a selectable printer candidate on a network and allows them to be caption-displayed at a position near the position indicated by a cursor on a printer selection picture plane displayed on a CRT.

6 Claims, 6 Drawing Sheets

300 PRINTER LIST

| PRINTER NAME | CONNECT TO | STATUS | NO. OF JOBS | TOTAL JOB SIZE |
|---|---|---|---|---|
| PRINTER A | LPT1: | NO PAPER | 0 | 0MB |
| PRINTER B | COLOR, DOUBLE-SIDED PRINT, A3·A4·B5, MEM 2048KB | PRINTABLE | 0 | 0MB |
| PRINTER C | 1.0.0.102 | PRINTING | 2 | 100MB |
| PRINTER D | ¥¥PRINTERSERVER D¥PRINTERD | PRINTABLE | 0 | 0MB |

MEM MAP OF MEM MEDIUM
(FD/CD-ROM)

| DIRECTORY |
|---|
| FIRST DATA PROCESSING PROGRAM PROGRAM CODES FOR FLOWCHART OF FIG. 4 |
| SECOND DATA PROCESSING PROGRAM PROGRAM CODES FOR FLOWCHART OF FIG. 5 |
| |

| PRINTER LIST | | | | |
|---|---|---|---|---|
| PRINTER NAME | CONNECT TO | STATUS | NO. OF JOBS | TOTAL JOB SIZE |
| PRINTER A | LPT1: | NO PAPER | 0 | 0MB |
| COLOR, DOUBLE-SIDED PRINT, A3 · *A4 · B5, MEM 2048KB NTABLE | | | 0 | 0MB |
| PRINTER C | 1.0.0.102 | PRINTING | 2 | 100MB |
| PRINTER D | ¥¥PRINTERSERVER D¥PRINTERD | PRINTABLE | 0 | 0MB |

PI-1
301
PI-2
PI-3
PI-4
302

DATA PROCESSING APPARATUS, DATA PROCESSING METHOD OF DATA PROCESSING APPARATUS, AND COMPUTER-READABLE MEMORY MEDIUM STORING PROGRAM THEREIN

This application is a divisional application of application Ser. No. 10/736,502, now allowed, filed Dec. 17, 2003, which is a continuation application of application Ser. No. 09/394,321, filed Sep. 13, 1999, now abandoned, both of which are incorporated herein by reference.

BACKGROUND OF THE INVENTION

1. Field of the Invention

The invention relates to a data processing apparatus which can communicate with a plurality of peripheral equipment through a predetermined communication medium, a data processing method of such a data processing apparatus, and a computer-readable memory medium which stores a program for such a data processing method.

2. Related Background Art

Hitherto, in a data processing apparatus, when executing an application to display a list of printers on a network which can be selected, first, in order to display construction information of the printers, a printer object (icon) is selected, a menu is subsequently displayed, a desired item in the menu is selected, and a property dialog box of the printer shown by the printer object has to be opened. Even in case of referring to a construction of the printer to be merely selected by the user, the user has to repeat the selection and instruction of the icon in accordance with a user interface (UI).

Even in case of referring to settable values of a plurality of construction information which can be set, the user has to select desired construction information on the property dialog box and refer to the settable values.

Therefore, when the user intends to print, in order to search a printer having a construction necessary for printing such that a color print can be performed or a paper of the A3 size can be used, he user has to successively examine by opening the property dialog box of each printer object. There is a problem such that in case of the unselectable construction as a result of opening the property dialog box, similar operations have to be performed even to the printer as a next selection candidate and an operation burden is large.

Further, in the above example, whether a default setting of the paper is A3 or A4 cannot be discriminated and, there is a drawback on operation such that in order to obtain a set value of default, the user has to select/confirm a paper size by opening the property dialog box.

SUMMARY OF THE INVENTION

The invention is made to solve the above problems and it is an object of the invention to provide a data processing apparatus with excellent operability such that on the basis of a selection instructing state for selectable peripheral equipment candidates, construction information of the peripheral equipment which is being selected is caption-displayed, and the construction information is displayed in a state where a property dialog box of a printer object is not opened, thereby remarkably reducing an operation burden until a timing when the construction information of the peripheral equipment is confirmed and enabling everyone to easily confirm the construction information of the selectable peripheral equipment by a simple operating instruction, and to provide a data processing method of such a data processing apparatus and a computer-readable memory medium which stores a program to realize such a data processing method.

Another object of the invention is to provide a construction such that by displaying all of set values and present set values of a plurality of construction information which can be set, the present set state can be easily confirmed in the plurality of construction information which are caption-displayed.

To accomplish the above objects, according to the invention, there is provided a data processing apparatus which can communicate with a plurality of peripheral equipment through a predetermined communication medium, comprising: obtaining means for obtaining construction information of the plurality of peripheral equipment; discriminating means for discriminating an overlap state of each icon per peripheral equipment in a peripheral equipment list to display statuses of the plurality of peripheral equipment and a cursor which can be moved and indicated; and control means for, when it is determined by the discriminating means that the cursor is overlapped on any of icons per peripheral equipment, allowing the construction information relative to the overlap-indicated icon per peripheral equipment obtained by the obtaining means to be caption-displayed at a position near the icon which is being indicated by the cursor.

The above and other objects and features of the present invention will become apparent from the following detailed description and the appended claims with reference to the accompanying drawings.

BRIEF DESCRIPTION OF THE DRAWINGS

FIG. 6 is a diagram for explaining a memory map of a memory medium to store various data processing programs which can be read out by the data processing apparatus according to the invention;

FIG. 7 is a diagram showing an example at the time of a drag and drop on a printer list picture plane which is displayed on the CRT shown in FIG. 2.

DETAILED DESCRIPTION OF THE PREFERRED EMBODIMENT

Figure 1:
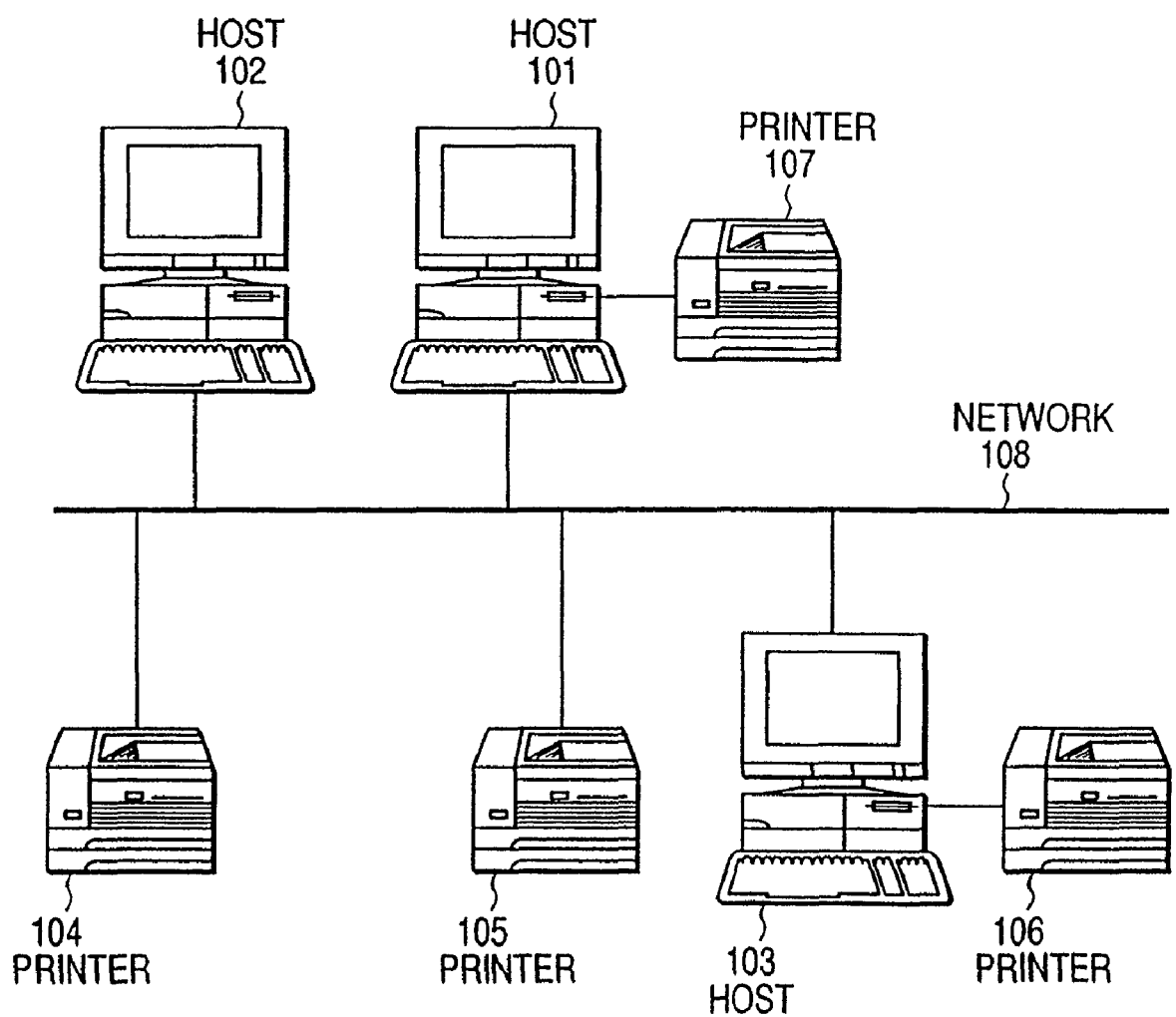
FIG. 1 is a system constructional diagram showing an example of a data processing system to which a data processing apparatus according to an embodiment can be applied.

FIG. 1 is a system constructional diagram showing an example of a data processing system to which a data processing apparatus according to an embodiment can be applied.

In FIG. 1, reference numerals 101 to 103 denote host computers (host machines) which are constructed so that they can communicate through a network 108 in accordance with a predetermined protocol and 104 to 107 indicate printers. The printers 106 and 107 function as local printers which are connected to the corresponding host machines 101 and 103 through an interface, which will be explained hereinlater. In the host computer 101, it is assumed that driver software of the printers 104 to 107 has been installed in a memory resource such as a hard disk or the like, which will be explained hereinlater, as a prerequisite.

It is assumed that the printers 106 and 107 are directly connected to the host machines 103 and 101, respectively, by a serial interface, a parallel interface, a universal serial bus (USB), an IEEE1394 interface, or the like and the printers 104 and 105 are directly connected to the network 108 by a network interface card (hereinafter, referred to as an NIC). The host machine 103 is connected to the network 108 and provides a printing function of the printer 106 to the machine on the network 108.

In the embodiment, the application obtains the construction information of the printers at the time of initialization or at periodic or random intervals after the initialization.

Figures 3, 4:
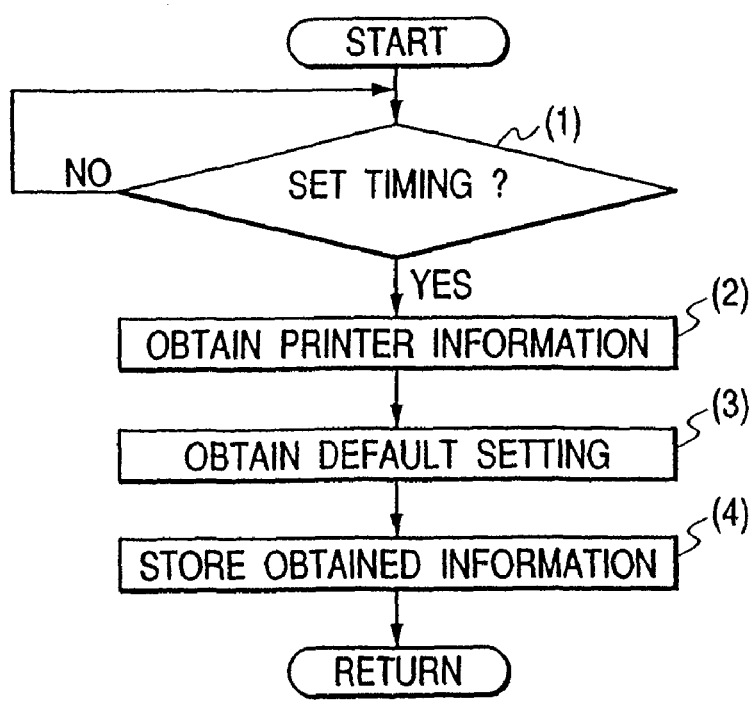
FIG. 3 is a diagram showing an example of a printer list picture plane which is displayed on a CRT 10 shown in FIG. 2.
FIG. 4 is a flowchart showing an example of a first data processing procedure in the data processing apparatus according to the embodiment.

Each of the host machines 101 to 103 displays the obtained construction information, as a caption, at the timing when a cursor is overlapped on a printer icon indicative of the printer when an application to display a printer list is executed or the timing when the cursor is overlapped on the printer icon indicative of the printer in a state where a text file icon is dragged as shown in FIG. 3, which will be explained hereinlater.

Figure 2:
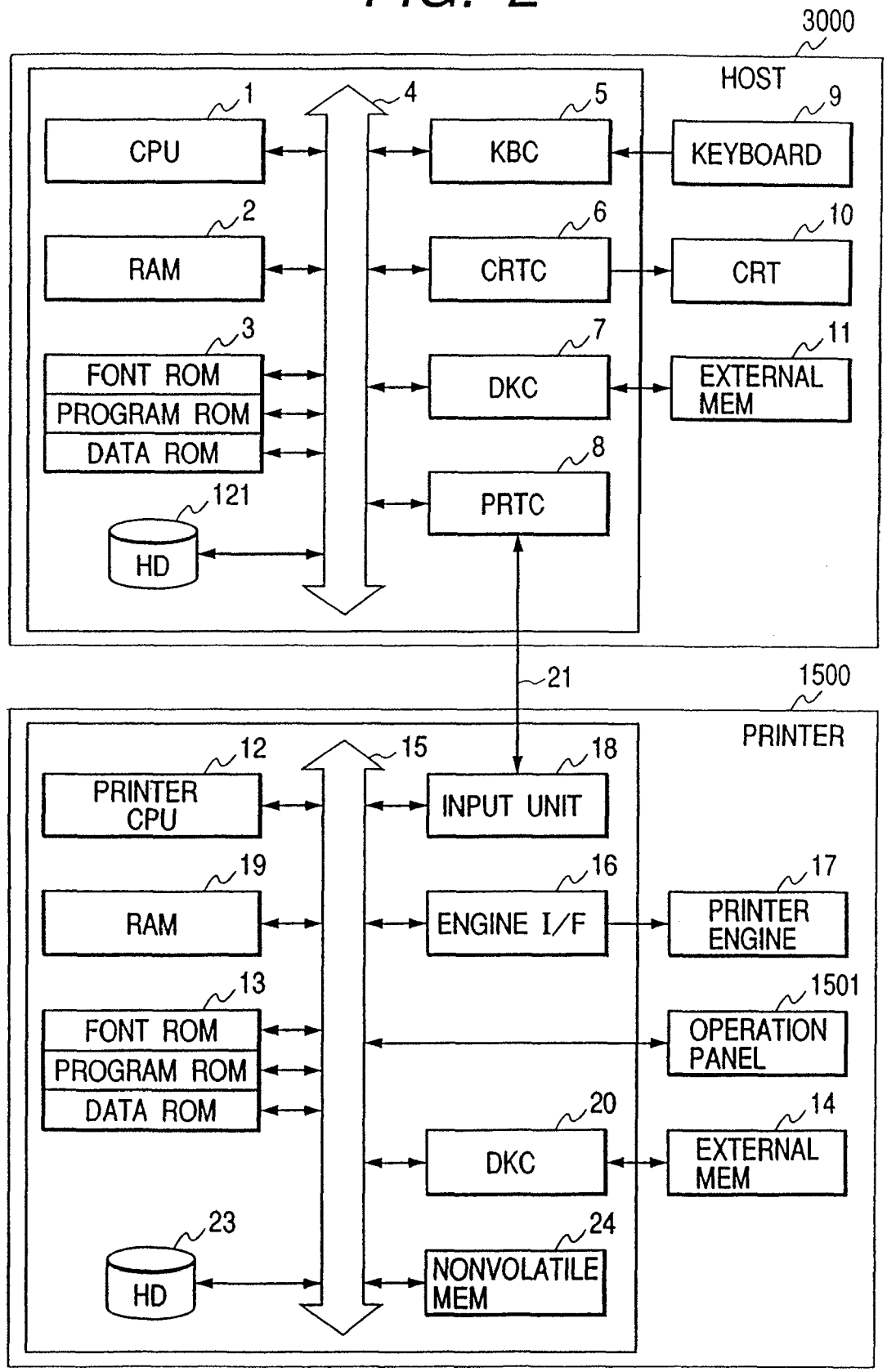
FIG. 2 is a block diagram for explaining a construction of a print system to which the data processing apparatus according to the embodiment can be applied.

FIG. 2 is a block diagram for explaining a construction of a print system to which the data processing apparatus according to the embodiment can be applied.

A laser beam printer (FIG. 1) will now be described as an example. The invention can be obviously applied to any of a system comprising single equipment, a system comprising a plurality of equipment, and a system in which processes are performed through a network such as an LAN or the like so long as the functions of the invention are executed.

In the diagram, reference numeral 3000 denotes a host computer having a CPU 1 for executing document processes of a document in which a figure, an image, characters, a table (including a spreadsheet), and the like mixedly exist on the basis of a document processing program or the like stored in a program ROM of an ROM 3. The CPU 1 integratedly controls devices connected to a system bus 4.

A control program and the like of the CPU 1 as shown in a flowchart shown in FIG. 4 is stored in the program ROM of the ROM 3. Font data and the like which are used in the document processes are stored in a font ROM of the ROM 3. Various data (for example, programs of various page description languages, data for rasterization of fonts, and the like) which is used when performing the document processes or the like is stored in a data ROM of the ROM 3.

Reference numeral 2 denotes an RAM which can be expanded by an option RAM or the like and functions as a main memory, a work area, or the like of the CPU 1 and 5 indicates a keyboard controller (KBC) for controlling a key input from a keyboard 9 or a pointing device (not shown).

Reference numeral 6 denotes a CRT controller (CRTC) for controlling a display of a CRT display (CRT) 10 and 7 indicates a disk controller (DKC) for controlling an access with an external memory 11 such as hard disk (HD), floppy disk (FD), or the like to store a boot program, various applications, font data, a user file, an edit file, and the like.

Reference numeral 8 denotes a printer controller (PRTC) which is connected to a printer 1500 through a predetermined bidirectional interface (interface) 21 and executes a communication control process with the printer 1500. The CPU 1 executes a developing (rasterizing) process of outline fonts into, for example, a display information RAM area set on the RAM 2, thereby enabling WYSIWYG on the CRT 10 to be performed.

The CPU 1 opens various registered windows on the basis of commands instructed by a mouse cursor or the like (not shown) on the CRT 10 and executes various data processes.

In the printer 1500, reference numeral 12 denotes a printer CPU (CPU) for integratedly controlling accesses with various devices connected to a system bus 15 on the basis of a control program or the like stored in a program ROM of an ROM 13 or a control program or the like stored in an external memory 14 and outputting an image signal as output information to a printing unit (printer engine) 17 connected through a printer engine interface 16.

A control program and the like which can be executed by the CPU 12 are stored in the program ROM of the ROM 13. Further, font data (including outline font data) and the like which are used when the output information is formed are stored in a font ROM of the ROM 13. In case of a printer without the external memory 14 such as a hard disk, information and the like which are used on the host computer 3000 are stored in a data ROM of the ROM 13.

The CPU 12 can perform a communicating process with the host computer 3000 through an input unit 18 and can notify the host computer 3000 of information and the like in the printer 1500.

Reference numeral 19 denotes an RAM which mainly functions as a main memory, a work area, or the like of the CPU 12 and is constructed such that a memory capacity can be expanded by an option RAM connected to an expanding port (not shown).

The RAM 19 is used for an output information rasterizing area, an environment data storing area, an NVRAM, or the like. An access to the external memory 14 such as hard disk (HD), IC card, or the like mentioned above is controlled by a disk controller (DKC) 20. The external memory 14 is connected as an option and stores font data (including font data which is downloaded from the host computer 3000 or the like), an emulation program (including an emulation program which is downloaded from the host computer 3000 or the like), form data (which is downloaded from the host computer 3000 or the like), and the like. Reference numeral 24 denotes a nonvolatile memory which stores printer set data.

Reference numeral 1501 denotes an operation panel on which operation switches, an LED display, and the like are arranged.

Each of the external memories 11 and 14 is not limited to one memory but can be constructed such that at least one or more memories are provided and in addition to the built-in fonts, a plurality of option font cards and external memories in which programs for interpreting printer control languages of different language systems have been stored can be connected. Further, it is also possible to have an NVRAM (not shown) and store printer mode set information per user and per group from the operation panel 1501.

FIG. 3 is a diagram showing an example of a printer list picture plane which is displayed on the CRT 10 shown in FIG. 2 and corresponds to a picture plane which is displayed by the execution of an application in association with a menu selecting instruction (not shown). This application can obtain status information of the printing apparatus, display the obtained status information to the operator, notify a print server of the order of a print job to print by a certain printing apparatus, obtain the order of the print jobs spooled in the printing apparatus by directly communicating with the printing apparatus, and instruct a deletion, a temporary stop, an order change of the print jobs spooled in the print server and printing apparatus, further, a change in the number of print copies, and the like. In the application, a printer list is displayed as shown in FIG. 3 and can be printed by performing the drag and drop (the operation such that the cursor of the mouse is positioned to an icon and the icon is picked up and moved by pressing the button of the mouse is called "drag" and the operation which is executed in a range from the movement of the icon to the release of the picked-up icon at a desired position is called "drag and drop") to a text file icon, a spreadsheet file icon, an image file icon, or the like by using the mouse.

Specifically speaking, a printer driver corresponding to the printing apparatus existing at the dragged and dropped position is started, a drawing function from the application to be opened in the file of the icon is received through the OS, and outputted to a port set as a PDL or image data. However, since such a printer management application is popular in recent years, its details are omitted.

In FIG. 3, reference numeral 300 denotes a printer list picture plane which is displayed when a printer list is selected by a menu (not shown). It corresponds to a case where printer icons PI-1 to PI-4 of printer candidates which can communicate are displayed as a list. When a printer management application is activated, the printers registered in the system are displayed. This application communicates to a connection destination and requests and obtains a status, the number of jobs, and the like.

Reference numeral 301 denotes a cursor. Since the cursor 301 is located at present on the printer icon PI-1, it corresponds to a state where construction information (which is obtained at the foregoing timing and has been stored and managed together with ID information on memory resources) of the printer 107 corresponding to the printer icon PI-1, for example, color, double-sided print, A3·A4·B5, and memory 2048 kB are caption-displayed. * denotes a default set value. *A4 indicates that a default of the paper size is A4.

The above construction is similarly applied to the case where the text file icon is dragged and the cursor is positioned on the printer icon as shown in FIG. 7.

The contents of the captions can be enlargedly displayed.

FIG. 4 is a flowchart showing an example of the first data processing procedure in the data processing apparatus according to the embodiment. The application corresponds to a process for obtaining the construction information of the printer and getting the default setting at the time of initialization and at periodic or random intervals after the initialization.

Reference numerals (1) to (4) denote processing steps.

Figure 8:
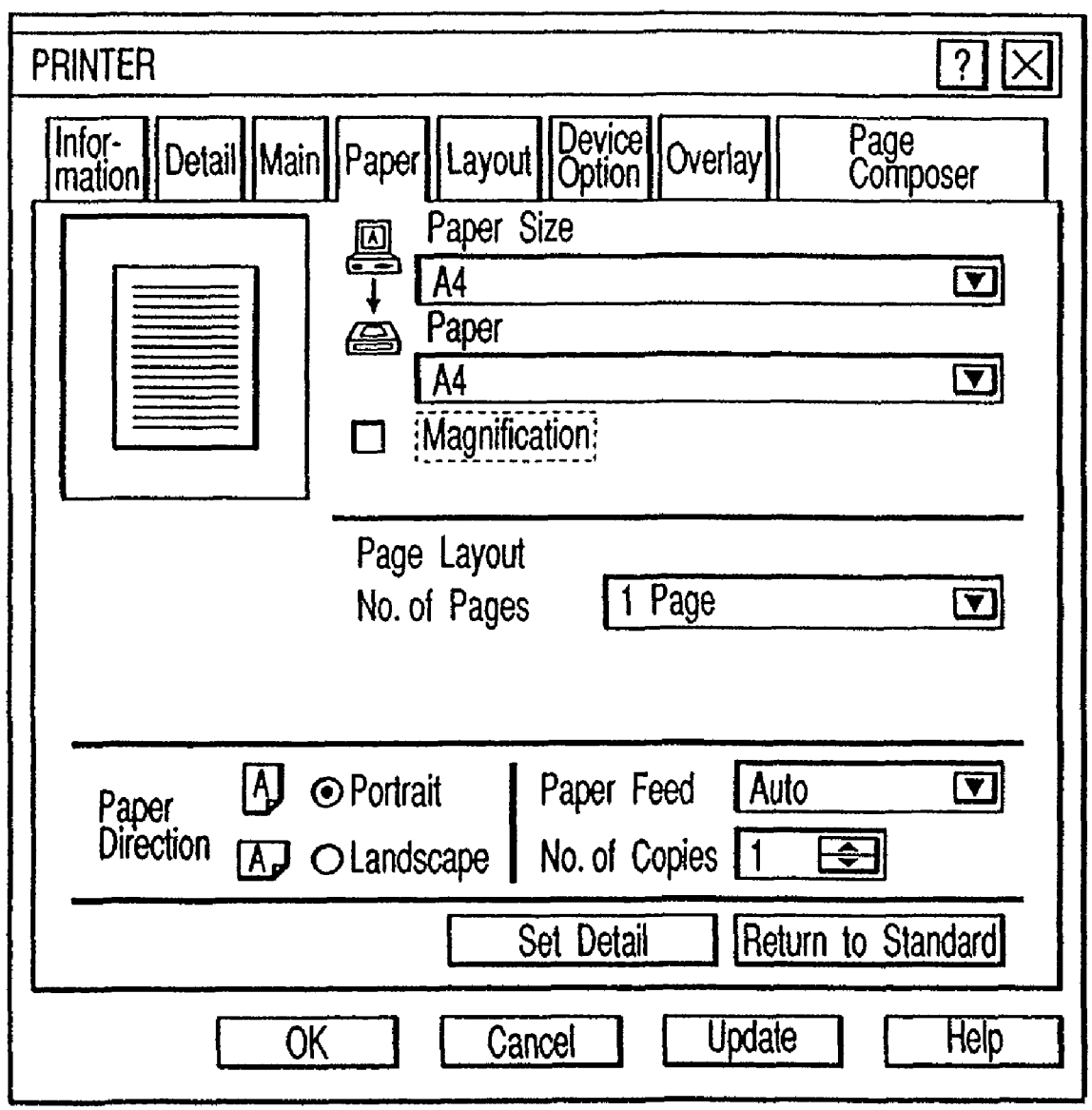
FIG. 8 is a diagram showing an example of a set picture plane when setting construction information in a driver of peripheral equipment.

First, a printer management application stored in the host machine 101 discriminates whether the present timing is the set obtaining timing or not (1). If NO, the apparatus waits until the present timing reaches the obtaining timing. If YES, the apparatus communicates with the printers 104 to 107 on the network 108 and obtains the construction information (for example, color, double-sided print, A3·A4·B5, memory 2048 kB) (2). After the construction information was obtained, the default set value of a plurality of construction information which can be set is obtained (3). There are a case where the default set value is obtained from the printer and a case where it is obtained from the printer driver stored in the host computer. In case of obtaining it from the printer., it is set by the operation panel (1501 in FIG. 2) of the printer and the default setting stored in the nonvolatile memory (24 in FIG. 2) or RAM (19 in FIG. 2) is obtained. In case of obtaining it from the host computer, it is set by the printer driver as software to perform a language process for outputting to the printer and the default setting stored in an HD (121 in FIG. 2) or RAM (2 in FIG. 2) is obtained. It is assumed that the operator preliminarily performs a print setting of the printer driver by a set picture plane as shown in FIG. 8. In case of the OS of Windows 95 (Microsoft Corporation of U.S.A.), the picture plane of FIG. 8 is displayed by right-clicking the printer icon of the print manager and displaying a property. In the diagram, it corresponds to a sheet to perform the setting regarding finishing of an output paper size or the like. In recent years, since the print setting is complicated to also enable the finishing, layout, and further, image processes, and the like to be performed, such a sheet is divided into a plurality of sheets as shown in FIG. 8, thereby allowing a desired item to be set. In FIG. 8, the sheet is divided into the sheets of "Main", "Paper", "Layout", "Device Option", "Overlay", and "Page Composer".

In the next step, the printer management application stores the obtained construction information together with the printer ID into the memory resources (for example, hard disk or RAM 2) (4) and finishes the processing routine. Thus, even if the selectable printer candidates are dynamically fluctuated because the printer is turned on/off on the network during the on state of the power source like a USB, IEEE1394, or the like, the latest printer construction information can be always obtained and managed.

Figure 5:
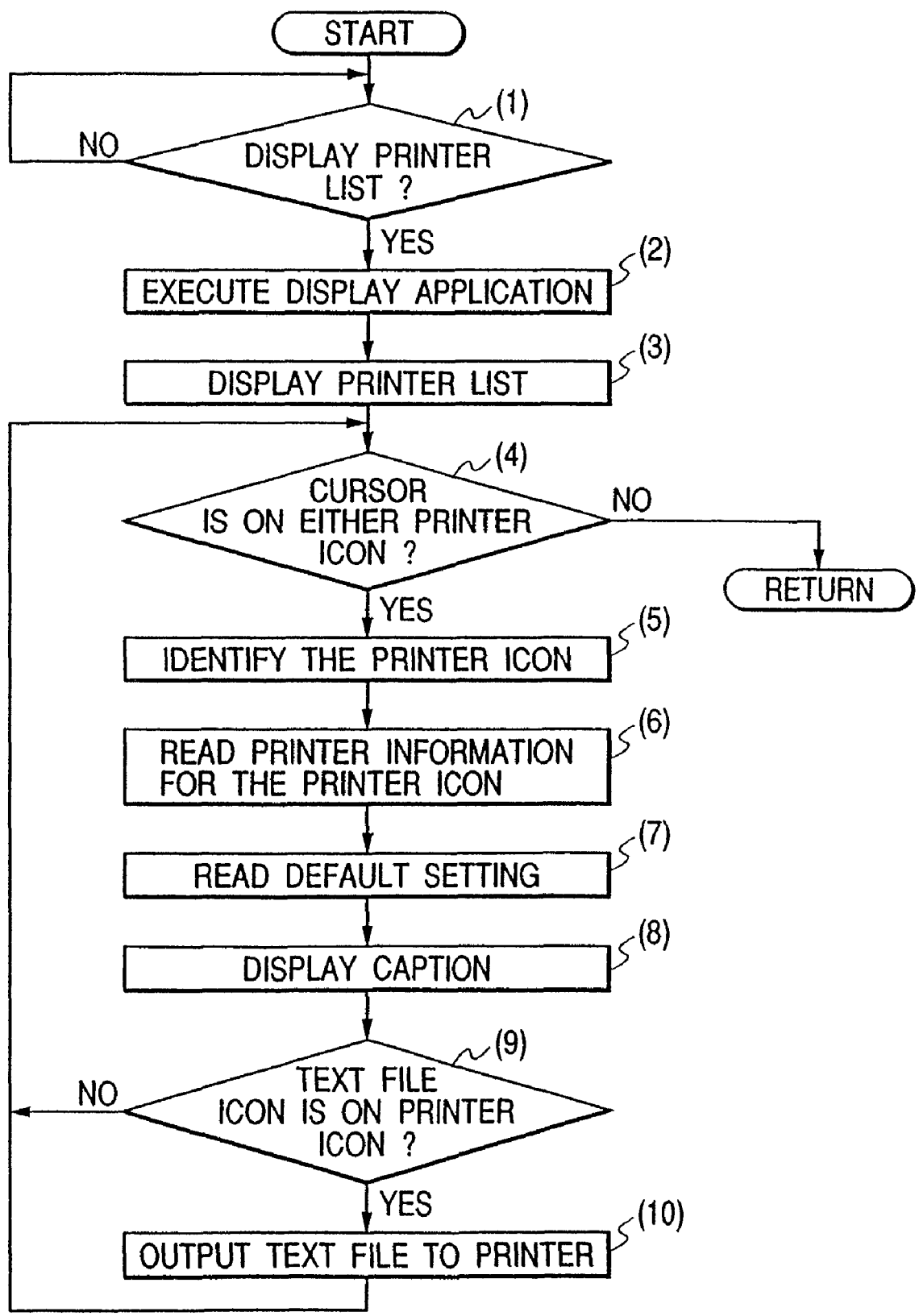
FIG. 5 is a flowchart showing an example of a second data processing procedure in the data processing apparatus according to the embodiment.

FIG. 5 is a flowchart showing an example of the second data processing procedure in the data processing apparatus according to the embodiment and corresponds to the display processing procedure of the printer construction information.

Reference numerals (1) to (8) indicate processing steps.

First, when a start request of the printer management application is issued from the OS and the printer list display is requested (1), a display application as a printer management application is executed (2) and the printer list picture plane including the printer icon which can communicate is displayed on the display unit (3). Subsequently, whether the cursor is overlapped on any of printer icons in the displayed printer list picture plane or not is discriminated (4). When it is determined that the cursor is not on the printer icon, the processing routine is returned. Since the discrimination about the overlap between the cursor of the icon or a text file or the like which is dragged by the icon and the printer icon is a technique which has conventionally been used, its detailed description is omitted.

When it is determined in step (4) that the cursor is on the printer icon or the text file icon is dragged and the cursor is on the printer icon, the printer management application identifies the overlapped printer icon (5). Subsequently, the printer construction information corresponding to the identified printer icon is read out from the memory resources (6). The printer construction information is previously stored into the memory resources by the method mentioned in FIG. 4. As for the printer construction information, when it is decided in step (5) that the cursor is overlapped, the information can be obtained as shown in FIG. 4 for the printer or printer driver. In this case, the predetermined timing in step (1) in FIG. 4 is a timing when the answer in discriminating step (5) in FIG. 5 is "Y", namely, when it is determined that the printer icon and the icon cursor (or the dragged text file) are overlapped.

Subsequently, the printer management application calls the default setting of the printer construction information (7) and displays the read-out printer construction information and default setting as captions (refer to FIGS. 3 and 7) (8). As mentioned above, when the setting is displayed as a caption, * showing the default setting is added just after the default setting (FIG. 7). After that, when it is determined in step (9) that the file icon has been dragged, namely, the text file icon and the cursor are overlapped and, further, the file icon has been dropped (released), as mentioned above, the corresponding printer driver of the printer is started and the print data is formed from the text file (spreadsheet file or image file) and outputted to the printer (10). In the other case, the processing routine is returned to step (4). When the text file is outputted to the printer, the drawing function which is provided by the OS is used. That is, in Windows 95, the drawing function called a GDI (Graphical Driver Interface) is used, the contents of the text file are sent to the GDI by a drawing function format called a GDI function. In the GDI, they are transferred to the printer driver by a drawing function format called a DDI (Device Driver Interface) function. The DDI function is a function of a format which can be interpreted by the device. In the printer driver, print data comprising PDL or image data is formed on the basis of the DDI function.

Thus, when the cursor is on the printer icon or when the text file icon is dragged and the cursor is on the printer icon, the construction information of the printer icon and the default setting of the construction information are caption-displayed. Therefore, by the simple operation such that the cursor is overlapped on each of the displayed printer icons on the printer list picture plane, the printer construction information and default setting are immediately displayed and their contents can be confirmed.

The embodiment has been described with respect to the case where the construction information and default setting of each printer are obtained at the foregoing timing and read out and displayed at the time of the cursor instruction. However, it is also possible to construct in a manner such that when the cursor 301 is overlapped onto the icon indicative of the printer in the display area of the application, the construction information of each printer on the network is obtained, the default setting of the construction information is obtained, and the obtained construction information and default setting are caption-displayed as shown in FIG. 3.

A construction of a data processing program which can be read out by the data processing apparatus according to the invention will now be described hereinbelow with reference to a memory map shown in FIG. 6.

FIG. 6 is a diagram for explaining the memory map of a memory medium to store various data processing programs which can be read out by the data processing apparatus according to the invention.

Although not particularly shown, there is also a case where information to manage the programs which are stored in the memory medium, for example, version information, names of the persons who made the programs, and the like are stored and information depending on the OS or the like on the program reading side, for example, an icon to identify and display the program and the like are stored.

Further, the data belonging to the various programs is also managed in a directory. There is also a case where a program to install the various programs into a computer or, when the program for installing has been compressed, a program for decompressing or the like is stored.

The printer management application having the functions shown in FIGS. 4 and 5 in the embodiment can be executed by the host computer by a program which is installed from the outside. In this case, the invention is applied even to a case where information including the programs is supplied to an output apparatus from a memory medium such as CD-ROM, flash memory, FD, or the like or from an external memory medium through the network.

The objects of the invention are also obviously accomplished by a method whereby a memory medium on which program codes of software to realize the functions of the embodiment as mentioned above have been recorded is supplied to a system or an apparatus and a computer (or a CPU or an MPU) of the system or apparatus reads out the program codes stored in the memory medium and executes them.

In this case, the program codes themselves read out from the memory medium realize the novel functions of the invention and the memory medium in which the program codes have been stored constructs the invention.

As a memory medium to supply the program codes, for example, it is possible to use any of a floppy disk, a hard disk, an optical disk, a magnetooptic disk, a CD-ROM, a CD-R, a magnetic tape, a nonvolatile memory card, an ROM, an EEPROM, and the like.

The invention incorporates not only a case where the functions of the embodiment mentioned above are realized by executing the read-out program codes by the computer but also a case where the OS (Operating System) or the like which operates on the computer executes a part or all of the actual processes on the basis of instructions of the program codes and the functions of the foregoing embodiment are realized by those processes.

Further, the invention also incorporates a case where the program codes read out from the memory medium are written into a memory equipped for a function expanding board inserted to a computer or a function expanding unit connected to the computer and, after that, a CPU or the like equipped for the function expanding board or function expanding unit executes a part or all of the actual processes on the basis of instructions of the program codes, and the functions of the embodiment are realized by those processes.

According to the embodiment, when the user intends to print, the necessity to open and examine the property dialog box of each printer each time in order to search the printer having the construction necessary to print can be eliminated. The load of the preparing work for printing of the user is reduced and the convenience is improved.

Although the embodiment has been described with respect to the example in which the printer is used as peripheral equipment, the peripheral equipment is not limited to the printer but the invention can be applied to any of a printer, a scanner, a facsimile apparatus, a copying apparatus, and a hybrid apparatus or a combination of them.

As described above, according to the invention, the construction information of each peripheral equipment can be preliminarily obtained and managed and by the simple operation such that the cursor is moved and overlapped to the peripheral equipment to be selected, the construction information such that it cannot inherently be confirmed unless the peripheral equipment is selected and the property is opened can be confirmed on the peripheral equipment list picture plane. The desired peripheral equipment of the user can be searched and selected in a short time.

By displaying all of the set values of a plurality of construction information which can be set and the present set value, the present set contents among the plurality of construction information which is caption-displayed can be easily confirmed.

Even when the print of the target file is instructed by the drag and drop, the construction information of the peripheral equipment can be easily confirmed. Therefore, the desired peripheral equipment of the user can be searched in a short time and the target file can be outputted.

The construction information of various peripheral equipment can be obtained and displayed by a similar simple operation and the construction information of the printer, scanner, facsimile apparatus, copying apparatus, and hybrid apparatus can be easily confirmed.

Since the universal serial bus or IEEE1394 is included as a connecting form of any of the peripheral equipment, even if the system constructing element is successively dynamically fluctuated, the latest construction information of the peripheral equipment which is recognized can be successively obtained and displayed to the user.

The construction information such that it inherently cannot be confirmed unless the peripheral equipment is selected and the property is opened can be confirmed on the peripheral equipment list picture plane while obtaining it from the peripheral equipment that is being instructed by the cursor by the simple operation such that the cursor is moved and overlapped on the peripheral equipment to be selected. The desired peripheral equipment of the user can be searched and selected.

Therefore, the operation burden which is applied until the construction information of the selectable peripheral equipment is confirmed is remarkably reduced. The construction information of the selectable peripheral equipment and the default setting of the construction information can be easily confirmed by everyone by the simple operating instruction. There is an effect such that the peripheral equipment selection operating environment of excellent operability which can easily output a text file can be freely constructed or the like.

The present invention is not limited to the foregoing embodiments but many modifications and variations are possible within the spirit and scope of the appended claims of the invention.

What is claimed is:

1. A data processing apparatus, comprising:
   a first display control unit constructed to control displaying of a first object of a first image forming apparatus and a second object of a second image forming apparatus; and
   a second display control unit constructed to control displaying such that, when a cursor is overlapping the first object, construction information of the first image forming apparatus is displayed, and such that when the cursor is overlapping the second object, construction information of the second image forming apparatus is displayed,
   wherein said second display control unit controls displaying such that a plurality of sheet sizes which the first or second image forming apparatus is able to store are displayed, and such that one of the plurality of sheet sizes currently set in the first or second image forming apparatus is displayed distinguishably from the rest of the plurality of sheet sizes.

2. The data processing apparatus according to claim 1, wherein the first or second object comprises an icon of a printer which can communicate with said data processing apparatus and a name of the printer.

3. A method for a data processing apparatus, comprising:
   a first display control step of controlling display of a first object of a first image forming apparatus and a second object of a second image forming apparatus; and
   a second display control step of controlling displaying such that, when a cursor is overlapping the first object, the construction information of the first image forming apparatus is displayed, and such that when the cursor is overlapping the second object, construction information of the second image forming apparatus is displayed,
   wherein said second display control step controls displaying such that a plurality of sheet sizes which the first or second image forming apparatus is able to store are displayed, and such that one of the plurality of sheet sizes currently set in the first or second image forming apparatus is displayed distinguishably from the rest of the plurality of sheet sizes.

4. The method according to claim 3, wherein the first or second object comprises an icon of a printer which can communicate with said data processing apparatus and a name of the printer.

5. A computer-readable medium storing a computer program for a data processing apparatus, comprising:
   a first display control step of controlling display of a first object of a first image forming apparatus and a second object of a second image forming apparatus; and
   a second display control step of controlling displaying such that, when a cursor is overlapping the first object, construction information of the first image forming apparatus is displayed, and such that when the cursor is overlapping the second object, construction information of the second image forming apparatus is displayed,
   wherein said second display control step controls displaying, such that a plurality of sheet sizes which the first or second image forming apparatus is able to store are displayed, and such that one of the plurality of sheet sizes currently set in the first or second image forming apparatus is displayed distinguishably from the rest of the plurality of sheet sizes.

6. The computer-readable medium according to claim 5, wherein the first or second object comprises an icon of a printer which can communicate with said data processing apparatus and a name of the printer.

* * * * *